Jan. 1, 1963 J. C. BARNES 3,071,334
VERTICAL LIFT AIRCRAFT
Filed Feb. 5, 1959
4 Sheets-Sheet 1

INVENTOR.
JOSEPH C. BARNES
BY
BUCKHORN, CHEATHAM & BLORE

ATTORNEYS

Jan. 1, 1963   J. C. BARNES   3,071,334
VERTICAL LIFT AIRCRAFT
Filed Feb. 5, 1959   4 Sheets-Sheet 2

*INVENTOR.*
JOSEPH C. BARNES
BY
BUCKHORN, CHEATHAM & BLORE

*ATTORNEYS*

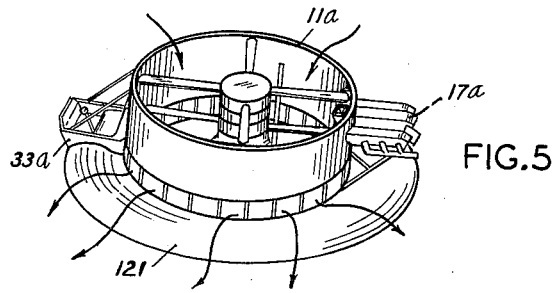
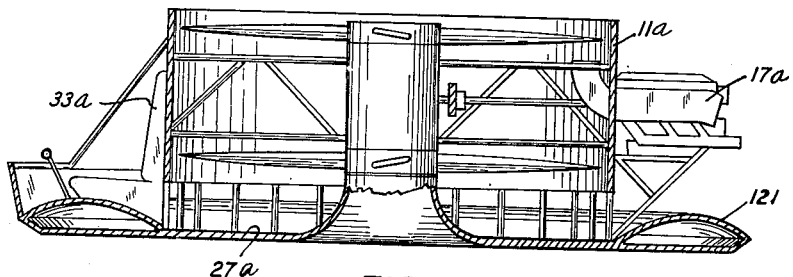
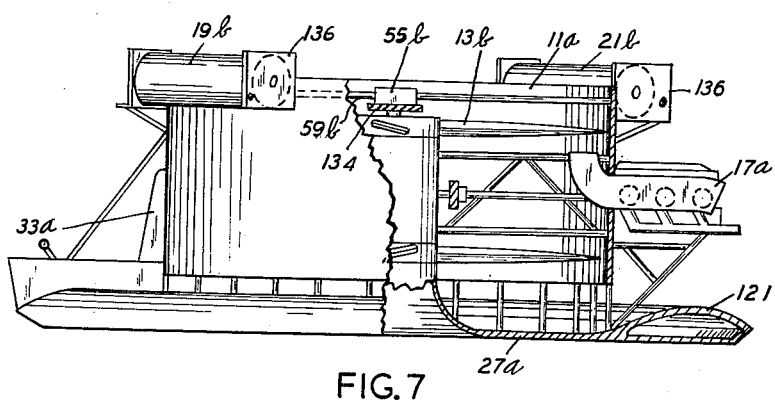

INVENTOR.
JOSEPH C. BARNES
BY
BUCKHORN, CHEATHAM & BLORE

ATTORNEYS

3,071,334
VERTICAL LIFT AIRCRAFT
Joseph C. Barnes, Box 136, Talent, Oreg.
Filed Feb. 5, 1959, Ser. No. 791,490
6 Claims. (Cl. 244—23)

This invention relates to vertical lift aircraft of the type having at least one set of revolving blades surrounded by a vertical tubular housing or duct.

In prior aircraft of the type under consideration, the air is forced downwardly through the duct toward the ground, and it is common knowledge that these aircraft cannot obtain substantial heights without excessive power requirements, and that variations in the terrain markedly affect the flight characteristics of the aircraft and particularly its height relative to the ground. This is commonly referred to as the "ground effect" problem.

It is a main object of this invention to provide an aircraft of the type under consideration which overcomes entirely or at least substantially the "ground effect" problem, and which can accomplish this with moderate power requirements.

A more specific object of the invention is to provide such an aircraft in which there is a baffle means located below the duct and which is operable to direct the downwardly flowing air in a lateral direction over structure which provides lift for the aircraft.

Another object of the invention is to provide an aircraft as described immediately above in which the structure assumes the form of one or more power-driven cylinders.

Another object of the invention is to provide an aircraft in which the structure assumes the form of one or more air foils, or assumes the form of one or more air foils and one or more power-driven cylinders.

A further object of the invention is to provide an aircraft of the type under consideration in which there is structure at the upper end of the duct over which the incoming air is drawn, and which upper structure provides lift for the aircraft.

A still further object of the invention is to provide an aircraft of the type under consideration having means for closing the upper end of the duct at the central portions thereof so as to direct a greater proportion of the incoming air over the lift structure at the upper end of the duct and also increase the speed of travel of the air over the upper structure.

Another object of the invention is to provide an aircraft as mentioned above equipped with means whereby the aircraft may be steered.

Various other objects of the invention will be apparent from the following description taken in connection with the accompanying drawings wherein:

FIG. 5 is a perspective view of a modified form of the invention;

FIG. 6 is a longitudinal vertical section through the aircraft shown in FIG. 5, FIG. 6 being taken on an enlarged scale;

FIG. 7 is a side view of a modified form of the invention, parts being broken away and shown in section for convenience in illustration;

General Description

Figure 1:
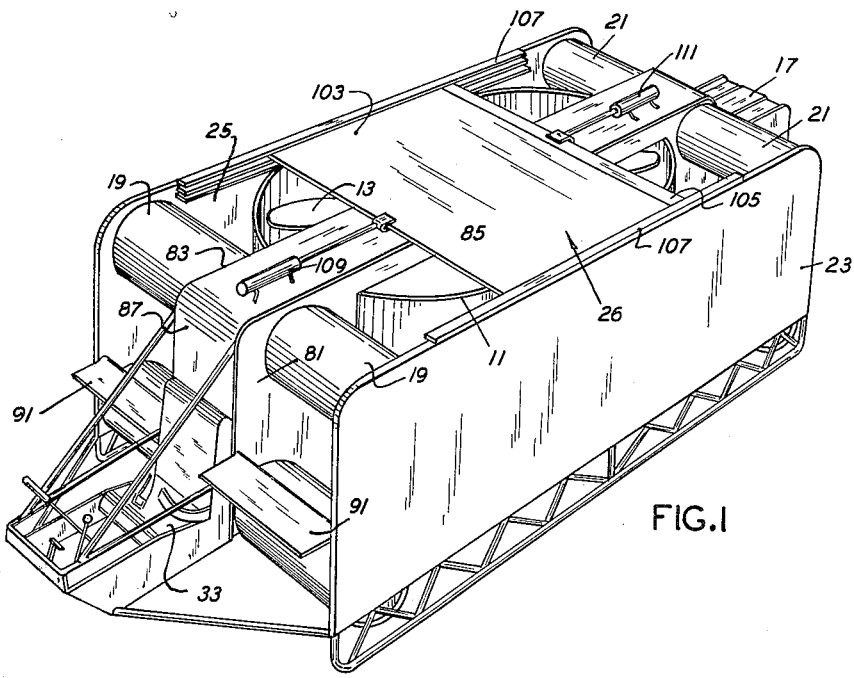
FIG. 1 is a perspective view of an aircraft embodying the concepts of the present invention.
Figure 2:
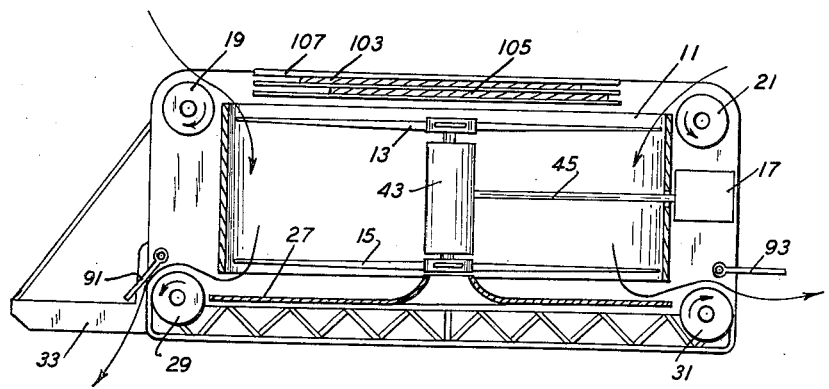
FIG. 2 is a vertical longitudinal section in somewhat diagrammatic form of the aircraft showing the relationship of important components.
Figure 3:
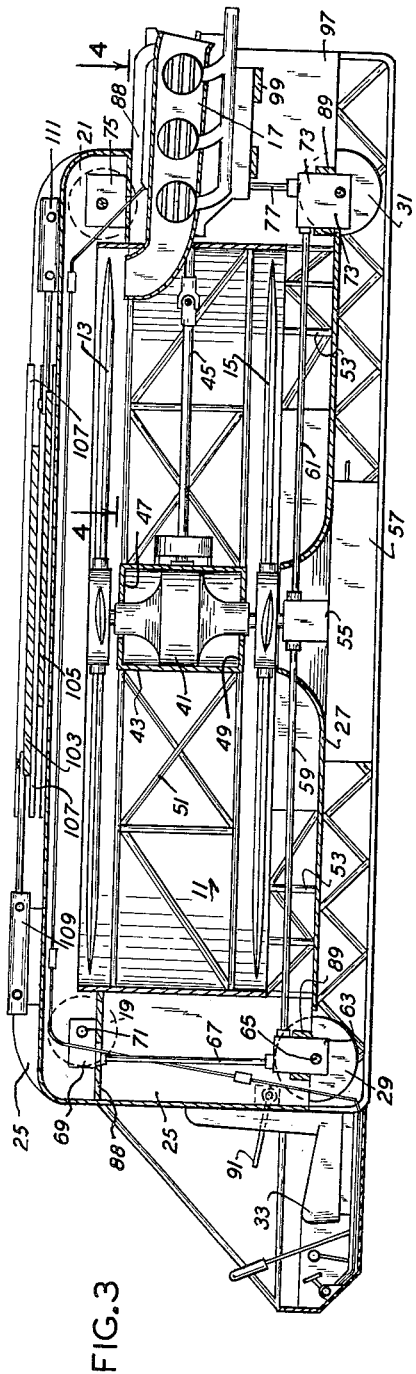
FIG. 3 is a vertical longitudinal midsectional view of the aircraft showing details of construction.

Referring to FIGS. 1, 2 and 3 and particularly to FIG. 3, the aircraft includes a vertical cylindrical duct 11 surrounding a pair of counter-rotating propellers 13 and 15 driven by an engine 17. The rotating propellers pull air downwardly into the duct, and a substantial portion of this incoming air is pulled over the upper surfaces of a pair of rotating coaxial cylinders 19 and a pair of rotating coaxial cylinders 21 which are mounted between a pair of upright side walls 23 and 25. The cylinders are driven in the directions indicated in FIG. 2 in a manner to be presently explained, and these directions are such that the upper surfaces of the cylinders move in the same direction as the air flowing thereover, but at a substantially greater speed. This gives a substantial upward lift. The speed of the incoming air may be better directed over the upper lift cylinders and the speed of the air may be increased by employing a closure plate means 26 which is disposed adjacent the upper end of the duct and which forms a closure at the central portion of the upper end of the duct. A substantial lift can be achieved without the closure means, but increased lift can be obtained with the closure means.

Below the duct 11 is a rectangular baffle plate 27 extending between and secured to the side walls 23 and 25 and spaced from the lower end of the duct. This baffle plate causes the downwardly moving air to move laterally over the upper surfaces of a pair of rotating coaxial cylinders 29 and a pair of rotating coaxial cylinders 31 which are mounted between the side walls 23 and 25 which are driven in a manner to be explained presently. The amount of lift realized from the use of cylinders 29 and 31 substantially exceeds that which would be obtained by allowing the air to move downwardly in engagement with the ground, and enables the aircraft to be free from the "ground effect" problem.

A seat 33 for the operator is provided at the left-hand or front end of the aircraft, as the parts are shown in FIGS. 1 and 2.

Detailed Description

Figure 4:
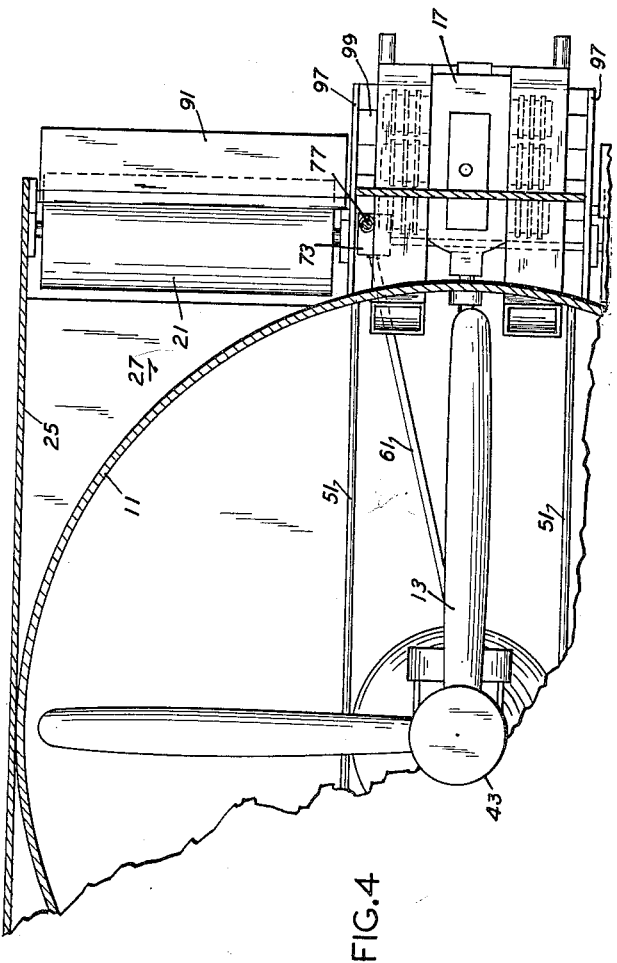
FIG. 4 is an enlarged horizontal section taken along line 4—4 of FIG. 3.

Referring to FIGS. 1 and 4, the duct 11 is secured at its side portions to the walls 23 and 25 at approximately the midportions of the walls considered longitudinally of the machine, and as previously mentioned the side edges of the baffle plate 27 are secured to such side walls. This construction provides a rigid frame for the aircraft.

Referring to FIG. 3, the propellers 13 and 15 within the duct 11 are driven by a differential 41 of conventional construction. The differential is mounted within and supported by a differential housing 43 and is driven by a shaft 45, which drivingly connects the differential and the internal combustion engine 17.

Referring particularly to FIG. 3, the differential housing 43 is of cylindrical form and has closed upper and lower ends 47 and 49. The housing is supported from the duct 11 by a pair of longitudinally extending trusses 51.

The duct 11 is connected to the baffle plate 27 by a plurality of connecting pieces and braces 53. The baffle is provided with an upwardly projecting central portion housing a gear box 55 which is driven by the differential 41 through the lower propeller 15. The gear box 55 is mounted on a gas tank 57 which is secured to the underside of the baffle plate 27 and is disposed between a pair of trusslike landing gear structures 58.

The gear box has a forwardly projecting output shaft 59 and a rearwardly projecting output shaft 61 leading to the forward and rearward lift cylinders respectively. The shaft 59 leads to a gear box 63 which is located midway between the side walls 23 and 25 and which has output shafting 65 driving the two cylinders 29. The gear box also has an upwardly extending output shaft 67 driving an upper gear box 69 having output shafting 71 driving the upper cylinders 19.

The cylinders 21 and 31 are similarly driven by gear boxes 73 and 75 and associated shafting, but it will be noted from FIG. 4 that the gear box 73 is offset from the longitudinal centerline of the aircraft so that the vertical shaft 77 connecting the gear boxes clears the engine 17. All of the cylinders have closed ends.

The various gears of the gear boxes are selected so that the cylinders 19, 21, 29 and 31 rotate in the directions indicated in FIG. 2 at a speed substantially greater than that of the air flowing thereover. For instance, in a typical aircraft of the type under consideration, the cylinders may be rotating at four times the speed of the air moving over the upper surfaces of the cylinders.

The lift cylinders are supported at their inner ends by a pair of spaced vertical supporting plates 81 and 83, which are best shown in FIG. 1. These plates are cut out to accommodate the duct 11 and to provide thin bridging portions 85 passing over the central part of the duct 11. The inner vertical edges of the plates 81 and 83 are secured to the duct 11 and the lower edges of the plates are secured to the forward and rearward edges of the baffle plate 27 as is best shown in FIG. 3. A coverplate 87 is secured to the outer edges of the supporting plates 81 and 83 as best shown in FIG. 1.

The gear boxes 69 and 75 are supported on mounting pieces 88 connected between the vertical plates 81 and 83, and the gear boxes 63 and 73 have mounting pieces 89 extending between the vertical plates 81 and 83 and by which the gear boxes are supported. Various bearings for the shafts of the driving arrangement and also the shafts of the cylinders are provided but are not specifically identified.

Direction control flaps 91 are provided at the front of the aircraft in association with the lower cylinders 29 and similar flaps 93 are provided at the rear of the machine associated with the two cylinders 31. The direction control flaps are pivotally mounted between the walls 23 and 25 and the vertical plates 81 and 83. Suitable control cables, not shown, are provided for the flaps. By pivoting the front flaps downwardly as shown in FIG. 2 and leaving the rear flaps upwardly, the aircraft can be caused to move rearwardly, and if the flaps are arranged so that the front flaps are up and the rear flaps are down, the aircraft can be moved forwardly. To turn the aircraft, one flap 91 can be arranged at a different angle than the other flap 93.

Suitable flexible controls 95 for the engine 17 are provided in the aircraft as best shown in FIG. 3, these flexible controls extending upwardly from the driver's seat and through the tunnel provided by the plates 81 and 83 and the coverplate 87 and then downwardly to the engine. The plates 81 and 83 have rearwardly projecting portions 97 straddling the engine 17. Suitable mounting strips 99 extend between the projecting portions 97 for supporting the engine 17.

The closure 26 previously mentioned comprises two superimposed plates 103 and 105, as best shown in FIG. 3. The side edges of these plates fit within guides 107 provided on the upper edges of the side walls 23 and 25 to permit horizontal movement of the closure plates. A pair of piston and cylinder units 109 and 111 are mounted on the coverplate 87 and are connected to the closure plates 103 and 105, respectively. A hand-operated hydraulic pump, not shown, may be provided adjacent the operator to enable the operator to control the positions of the closure plates by selected supply of fluid under pressure to the piston-and-cylinder units.

The plates are shown in FIG. 1 as being substantially in overlying relationship, but the upper plate 103 can be moved forwardly and the lower plate 105 moved rearwardly to further close the central portion of the upper end of the duct 11 and therefore direct a greater proportion of the incoming air over the upper lift cylinders and also increase the speed of the incoming air. This means that there will be an increased lift. This is useful in take-off and landing or for other desired purposes.

FIGS. 5 and 6 show a modified form of the invention in which the duct 11a and the propellers and differential arrangement therewithin are very similar to the form of the invention previously described. The motor 17a drives the differential in a manner similar to that previously described. In this form of the invention however there are no side walls 23 and 25 and the baffle plate 27a is of generally circular form and includes an upwardly projecting peripheral annular portion 121 over which the air pulled downwardly through the duct 11 passes. The upwardly projecting portion 21 is in the form of an air foil and therefore provides vertical lift for the aircraft.

It is pointed out that in this form of the invention no upper cylinders or lower cylinders are provided, although upper cylinders could be provided if desired. The operator's seat 33a is mounted on the forward portion of the baffle 27a as best shown in FIG. 5.

Figure 8:
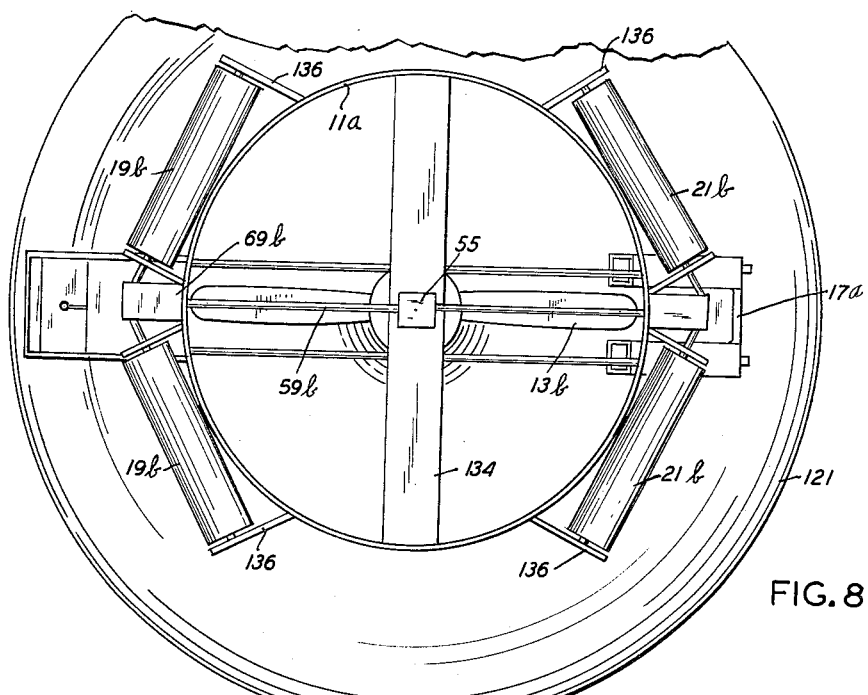
FIG. 8 is a top view of the aircraft shown in FIG. 7.

FIGS. 7 and 8 show a further modified form of the invention which is similar to that disclosed in FIGS. 5 and 6 in so far as the duct and the baffle plate are concerned, but differs from the FIG. 5 and 6 form of the invention in that the FIG. 7 and 8 form of the invention includes upper cylinders 19b and 21b. The cylinders 19b are not coaxial but are oblique with reference to one another as shown in FIG. 8 and are driven from a gear box 69b by a shaft 59b driven by a gear box 55b which in turn is driven by the upper propeller 13b. A supporting strip 134 extending across the duct 11 supports the gear box 55b. The rear cylinders 21b are mounted in a fashion similar to that described in connection with cylinders 19b.

As best shown in FIG. 8, there are upright mounting plates 136 for all of the cylinders, which mounting plates shield the ends of the cylinders so that a more effective lift is provided.

Figure 9:
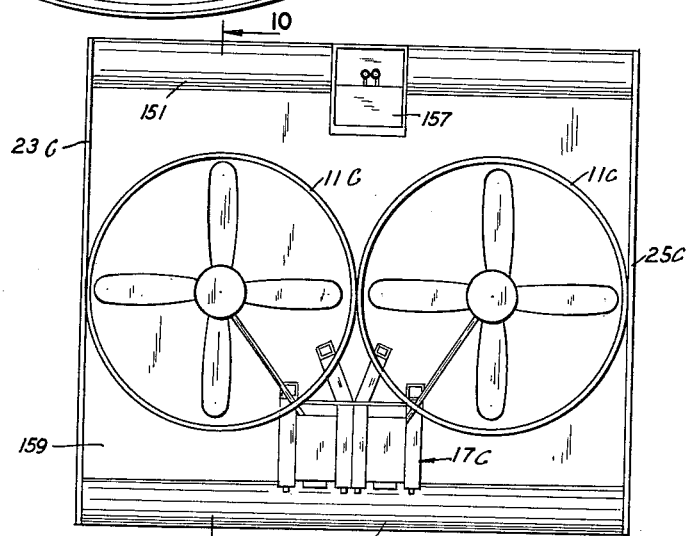
FIG. 9 is a top view of a still further modified form of the invention.
Figure 10:
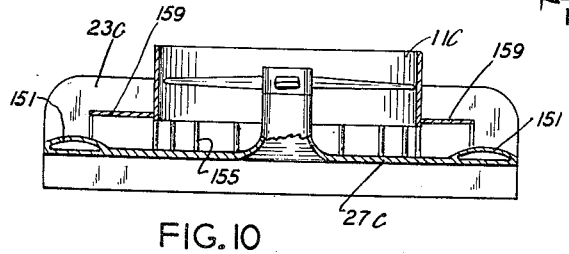
FIG. 10 is a vertical section taken along line 10—10 of FIG. 9.

FIGS. 9 and 10 show a further form of the invention which includes two duct units 11c and 11c' mounted on a generally rectangular baffle plate 27c, there being side plates 23c and 25c secured to the units 11c and 11c' respectively. The units are driven by an engine unit 17c.

The left and right-hand ends of the baffle plates 27c are provided with straight air foil sections 151 over which the downwardly flowing air moves as the air is deflected laterally by the baffle plate.

The ducts of the duct unit are mounted on the baffle plate by posts 155. A driver's compartment 157 is provided at the front of the aircraft, and suitable controls at the driver's compartment are provided for controlling the operation of the engine unit 17c. Instead of the air foil sections 151, rotating cylinders could be provided, or rotating cylinders could be provided at the upper ends of the duct unit to achieve greater lift.

The lower ends of the duct units are surrounded by a mounting plate 159 which has openings to receive the duct units. The mounting plate is secured at its side edges to the walls 23c and 25c as is best apparent by a comparison of FIGS. 9 and 10.

Having described the invention in what is considered to be the preferred embodiment thereof, it is desired that it be understood that the invention is not to be limited other than by the provisions of the following claims.

I claim:

1. A vertical lift aircraft comprising a vertical duct, counter-rotating propeller means in said duct for pulling air downwardly through said duct, baffle means below the lower end of said duct for directing the downward moving air laterally, and air deflecting means positioned in the path of the laterally moving air and movable to different positions for controlling the direction of flight of said aircraft, lift structure adjacent the upper end of said duct, and baffle means over the upper end of said duct and mounted for horizontal movement independently of the position of said propeller means and adjustable to various horizontal positions relative to the duct and lift structure to regulate the velocity of the air traveling over said lift structure.

2. A vertical lift aircraft comprising a vertical duct, counter-rotating propeller means in said duct for pulling air downwardly through said duct, baffle means below the lower end of said duct for directing the downward moving air laterally, and air deflecting means positioned in the path of the laterally moving air and movable to different positions for controlling the direction of flight of said aircraft, lift structure between the air deflecting means and the lower end of said duct and positioned in the path of travel of the laterally moving air, and lift structure at the upper end of said duct over which the incoming air flows, and baffle means over said duct and mounted for horizontal movement independently of the position of said propeller means and movable to various horizontal positions to regulate the velocity of the incoming air over the upper lift structure.

3. A vertical lift aircraft comprising a vertical duct, propeller means mounted for rotary movement within said duct for pulling air downwardly through said duct, lift structure positioned in offset relation to the center line of said duct and disposed at a level near the lower end of said duct, and baffle means below the lower end of said duct for directing the downwardly moving air laterally and over the upper surfaces only of said lift structure, said lift structure including rotary cylinders driven at a speed substantially greater than that of the air moving thereover, said rotary cylinders having their axes of rotation disposed generally horizontally.

4. A vertical lift aircraft comprising a vertical duct, propeller means mounted for rotary movement within said duct for pulling air downwardly through said duct, lift structure positioned in offset relation to the center line of said duct and disposed at a level near the lower end of said duct, baffle means below the lower end of said duct for directing the downwardly moving air laterally and over the upper surfaces only of said lift structure, other lift structure at the upper end of the duct over which incoming air is drawn, said other lift structure including rotary cylinders driven at a speed substantially greater than that of the air moving thereover, said rotary cylinders having their axes disposed generally horizontally.

5. A vertical lift aircraft comprising a vertical duct, propeller means mounted for rotary movement within said duct for pulling air downwardly through said duct, lift structure positioned in offset relation to the center line of said duct and disposed at a level near the lower end of said duct, baffle means below the lower end of said duct for directing the downwardly moving air laterally and over the upper surfaces only of said lift structure, upper lift structure at the upper end of the duct over which incoming air is drawn, said upper lift structure including rotary cylinders driven at a speed substantially greater than that of the air moving thereover, said rotary cylinders having their axes disposed generally horizontally, and baffle means at the upper end of the duct effectively closing off the central portion of the duct to the flow of incoming air so that a greater proportion of the incoming air passes over said upper lift structure than would be the case without such closure means.

6. A vertical lift aircraft comprising a vertical duct, propeller means mounted for rotary movement within said duct for pulling air downwardly through said duct, lift structure positioned in offset relation to the center line of said duct and disposed at a level near the lower end of said duct for directing the downwardly moving air laterally and over the upper surfaces only of said lift structure, upper lift structure at the upper end of the duct over which incoming air is drawn, and closure means at the upper end of the duct effectively closing off the central portion of the duct to the flow of incoming air so that a greater proportion of the incoming air passes over the upper lift structure than would be the case without such closure means, said closure means being mounted at a fixed level and being horizontally adjustable to vary the extent of closure.

References Cited in the file of this patent

UNITED STATES PATENTS

| | | |
|---|---|---|
| 1,432,787 | Reyes | Oct. 24, 1922 |
| 1,776,994 | Chattin | Sept. 30, 1930 |
| 2,014,051 | Nishi | Sept. 10, 1935 |
| 2,547,266 | Hoglin | Apr. 3, 1951 |
| 2,718,364 | Crabtree | Sept. 20, 1955 |